United States Patent
Nishida

(10) Patent No.: US 8,582,400 B2
(45) Date of Patent: Nov. 12, 2013

(54) DATA LIBRARY APPARATUS

(71) Applicants: Hitachi-LG Data Storage, Inc., Tokyo (JP); Hitachi Consumer Electronics Co., Ltd., Tokyo (JP)

(72) Inventor: Toshio Nishida, Tokyo (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/654,515

(22) Filed: Oct. 18, 2012

(65) Prior Publication Data

US 2013/0100786 A1   Apr. 25, 2013

(30) Foreign Application Priority Data

Oct. 21, 2011 (JP) .................................. 2011-231251

(51) Int. Cl.
*G11B 7/24* (2013.01)
(52) U.S. Cl.
USPC ....................................... 369/30.39; 369/30.3
(58) Field of Classification Search
USPC ............ 369/30.39, 30.4, 30.42, 30.63, 30.86, 369/30.79, 30.94, 30.78, 30.35, 30.06, 369/30.32, 30.03, 30.08, 30.1
See application file for complete search history.

(56) References Cited

U.S. PATENT DOCUMENTS

| | | | | |
|---|---|---|---|---|
| 5,621,708 A * | 4/1997 | Fujita et al. | ................. | 369/30.78 |
| 5,652,741 A * | 7/1997 | Takagi | ........................ | 369/30.06 |
| 5,892,738 A * | 4/1999 | Hirao et al. | ................. | 369/30.32 |
| 5,903,528 A * | 5/1999 | Yoshimura | ................. | 369/30.35 |
| 6,940,787 B2 * | 9/2005 | Kajiyama et al. | ........... | 369/30.86 |
| 6,977,872 B2 * | 12/2005 | Nagone | ....................... | 369/30.86 |
| 7,092,320 B1 * | 8/2006 | Lee et al. | .................... | 369/30.32 |
| 2003/0058754 A1* | 3/2003 | Nagone | ....................... | 369/30.35 |
| 2008/0316875 A1* | 12/2008 | Chan | ........................... | 369/44.11 |
| 2009/0166965 A1* | 7/2009 | Fukasawa | ................. | 271/265.03 |

FOREIGN PATENT DOCUMENTS

JP    8-63857    3/1996

* cited by examiner

*Primary Examiner* — Nabil Hindi
(74) *Attorney, Agent, or Firm* — Antonelli, Terry, Stout & Kraus, LLP.

(57) ABSTRACT

A data library apparatus capable of changing the mounting positions of disks on the basis of information recorded in the disks and the access histories of the disks. Disks expected to be accessed next are mounted in advance on data recording/reproducing devices, on slots nearer to the data recording/reproducing devices, or on a disk carrying device, etc. In addition, disks relevant to currently active disks are mounted on positions so that the optical disk carrying device can bring out the relevant disks at a time without being moved, and hereby the time necessary for disk access in the data library apparatus can be reduced.

9 Claims, 6 Drawing Sheets

| DISK INFORMATION | | | | |
|---|---|---|---|---|
| DISK ID | POSITION INFORMATION | NUMBER OF ACCESSES | DISK-CROSSING INFORMATION | DATA CONTENT |
| 0001 | SLOT 1 | 70 | — | IMAGE DATA |
| 0002 | SLOT 2 | 10 | — | DOCUMENT DATA |
| 0003 | DATA RECORDING/ REPRODUCING DEVICE | 30 | — | DOCUMENT DATA |
| 0004 | OPTICAL DISK CARRYING DEVICE | 20 | 0001 | IMAGE DATA |
| 0005 | SLOT 5 | 40 | — | DOCUMENT DATA |
| 0006 | SLOT 6 | 15 | — | DOCUMENT DATA |
| 0007 | SLOT 7 | 0 | 0002 | IMAGE DATA |
| ⋮ | ⋮ | ⋮ | ⋮ | ⋮ |

DATA LIBRARY APPARATUS

FIELD OF THE INVENTION

The present invention relates to data library apparatuses.

BACKGROUND OF THE INVENTION

One of the background arts concerning this technology fields is disclosed in Japanese Unexamined Patent Application Publication No. Hei8 (1996)-63857. This Patent Application Publication says, "This invention provides a library apparatus that has an improved access capability and can reliably store the differences of access frequencies based on needed storage capacities, and an access frequency control method for the same".

SUMMARY OF THE INVENTION

In Japanese Unexamined Patent Application Publication No. Hei8 (1996)-63857, an access frequency control method used for a library apparatus in which storage positions of optical disks are changed on the basis of access frequencies to respective optical disks is described. However, in this Patent Application Publication, the preparation of disks and mounting method of disks for speeding up of disk access are not taken into consideration. Therefore, the present invention will deal with speeding up of disk access in view of the preparation of disks or storage method of disks as a problem.

The above problem can be solved, for example, by preparing a certain disk and disks relevant to the certain disk in advance in a data library.

In an embodiment of the present invention, a disk to be used next can be prepared in advance on the basis of the information recorded in a currently active disk or the access history of the currently active disk, which leads to the reduction of the time necessary for disk access in a data library apparatus.

DETAILED DESCRIPTION OF THE PREFERRED EMBODIMENTS

The embodiments of the present invention will be described with reference to the accompanying drawings.

First Embodiment

Figure 1:
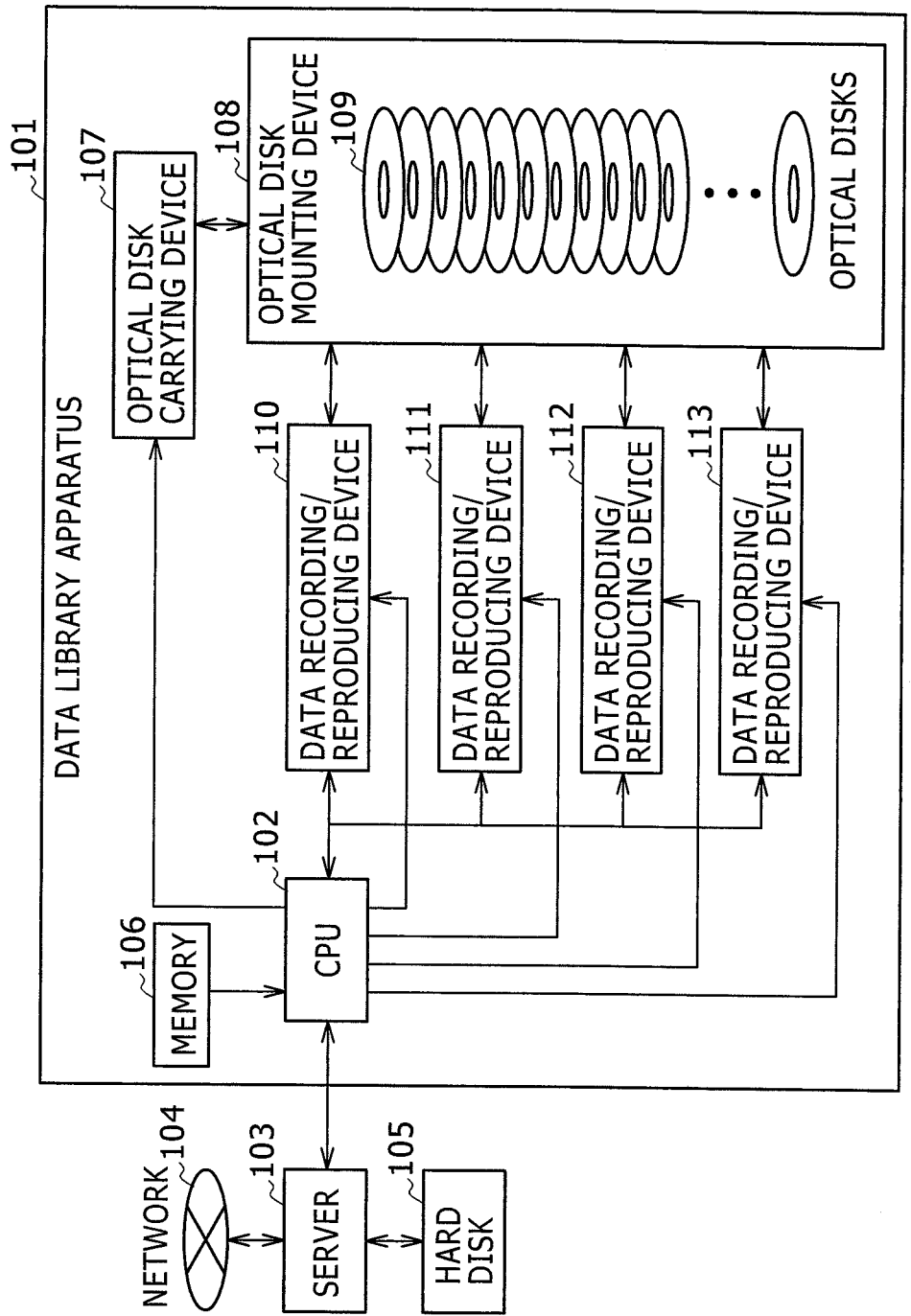
FIG. 1 is a block diagram showing the configuration of a data library apparatus.

FIG. 1 is a block diagram showing the configuration of a data library apparatus.

The reference numeral 101 denotes a data library apparatus that receives data via a network 104 at the time of recording, and stores the data in a hard disk 105 via a server 103, and further records the stored data in optical disks 109. The data library apparatus 101 reproduces data retrieved from the hard disk 105 or the optical disk 109 at the time of reproducing, and sends the reproduced data to the network 104 via the server 103. The reference numeral 103 denotes the server that controls the data library apparatus 101 through communicating with a CPU (central processing unit) 102 embedded in the data library apparatus 101, and at the same time controls the hard disk 105, and thereby performs data management concerning data recording/reproducing, data transmitting/receiving, and the like via the network 104. The reference numeral 105 denotes the hard disk that is controlled by the server 103, and stores data sent via the network 104. The reference numeral 109 denotes the plural optical disks that are mounted on an optical disk mounting device 108. Although only one optical disk mounting device 108 is shown in FIG. 1, it is conceivable that plural optical disk mounting devices can be embedded in the data library apparatus 101, and these optical disk mounting devices can be classified, for example, into optical disk mounting devices for the use of unused optical disks and optical disk mounting devices for the use of used optical disks. It goes without saying that the inside of an optical disk mounting device 108 can be divided into two parts—one part used for mounting unused optical disks, and the other part used for mounting used optical disks. The optical disks 109 are brought out from the optical disk mounting device 108 at the time of recording data, and mounted on data recording/reproducing devices 110, 111, 112, and/or 113 by a disk carrying device 107, and brought back to the optical disk mounting device 108 by the disk carrying device 107 after recording the data is finished. On the other hand, the optical disks 109 are brought out from the optical disk mounting device 108 at the time of reproducing data, data recorded in the optical disks 109 are reproduced by the data recording/reproducing devices 110, 111, 112, and/or 113, and then the optical disks 109 are brought back to the optical disk mounting device 108 by the disk carrying device 107 after reproducing the data is finished. The reference numerals 110, 111, 112, and 113 denote the data recording/reproducing devices that are controlled by the CPU 102 of the data library apparatus, and record data in the optical disks 109 or reproduce data from the optical disks 109. Although four data recording/reproducing devices are shown in FIG. 1, any number of data recording/reproducing devices may be provided in the data library apparatus 101. The reference numeral 107 denotes the optical disk carrying device that is controlled by the CPU 102 of the data library apparatus, and brings out the optical disks 109 from the optical disk mounting device 108, carries the optical disks 109, and mounts them on the data recording/reproducing devices 110, 111, 112, and/or 113. On the other hand, the optical disk carrying device 107 also brings back the optical disks from the data recording/reproducing devices 110, 111, 112, and/or 113, carries the optical disks 109, and mounts them on the optical disk mounting device 108. In the case where the positions of the optical disks are arranged inside the optical disk mounting device 108, the optical disk carrying device 107 are also used for carrying those disks. The reference numeral 102 denotes the CPU of the data library apparatus that controls the optical disk carrying device 107 on the basis of a request from the server 103 so that the optical disk carrying device 107 selects a desired optical disk among plural optical disks 109 mounted on the optical disk mounting device 108, and carries this optical disk to the data recording/reproducing device 110, 111, 112, or 113. In addition, the CPU 102 controls the optical disk carrying device 107 so that the optical disk carrying device 107 receives an optical disk 109 from the data recording/reproducing devices 110, 111, 112, or 113, and mounts this optical disk on a predetermined position inside the optical disk mounting device 108. The reference numeral 106 denotes a memory that stores programs for controlling the CPU 102 of the data library apparatus 101, and various pieces of information.

Figures 2, 3:
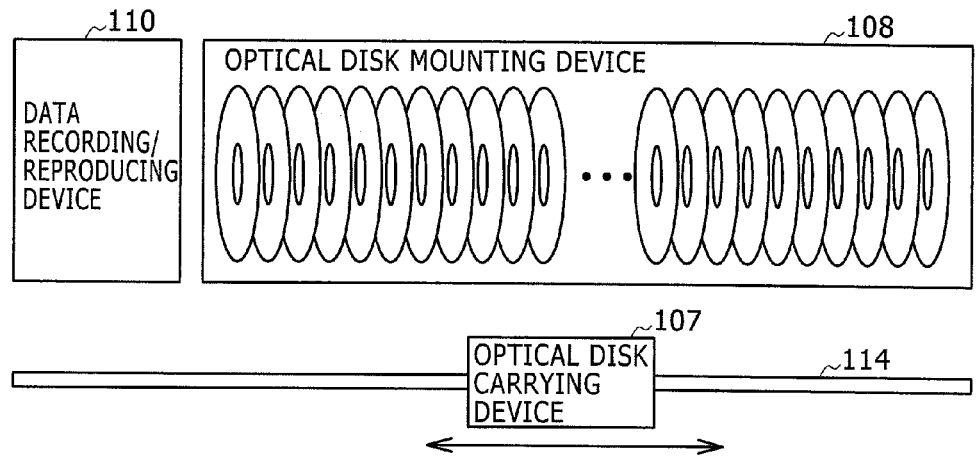
FIG. 2 is a diagram showing an example of the arrangement of various devices in the data library apparatus.
FIG. 3 is a diagram showing an example of disk information stored in a memory.

FIG. 2 is a diagram showing an example of the arrangement of various devices in the data library apparatus.

The data recording/reproducing device 110 is disposed next to the optical disk mounting device 108. A rail 114 is set up along these devices, and the optical disk carrying device 107 moves along this rail. When a disk is accessed, the optical disk carrying device 107 moves to the storage position of the disk to be accessed and brings out the disk. The optical disk carrying device 107 carries the brought-out disk to the data recording/reproducing device 110, and mounts the disk on the data recording/reproducing device 110. After the data recording/reproducing device 110 finishes accessing the disk, the optical disk carrying device 107 carries the disk to the optical disk mounting device 108, and mounts the disk on the original storage position in the optical disk mounting device 108. In addition, plural data recording/reproducing devices can be disposed in the data library apparatus. In this case, it is necessary to dispose the plural data recording/reproducing devices along the rail 114 so that the optical disk carrying device 107 can access all the data recording/reproducing devices.

This embodiment provides two methods in which a next accessed disk is predicted, and if required, the disk can be quickly accessed.

Two examples will be described as methods to predict a next accessed disk.

A first method is a method concerning reproducing data that is stored across two disks. In the case where data a user is accessing is stored across two disks, it becomes necessary to obtain both anterior data stored in one of the two disks and posterior data stored in the other disk in order to reproduce the entirety of the data. Therefore, in the case where data stored across two disks is reproduced, the time necessary to access the two disks can be reduced by preparing the disk on which the posterior data is stored is prepared in advance. A second method is a method concerning reproducing two sets of data that correlate with each other. In this case, data that has a possibility to be accessed next can be predicted by judging from the contents of data a user is now accessing. Therefore, it becomes possible to reduce the time necessary for disk access by preparing in advance a disk including data having contents associated with the contents of the data the user is now accessing. Means for realizing the above methods will be described in detail hereinafter.

FIG. 3 is a diagram showing an example of disk information stored in the memory 106.

The memory 106 stores, as disk information, disk IDs that are used for identify individual disks; position information concerning the positions of individual disks; access number concerning the number of accesses to each disk; disk-crossing information that shows whether each disk has data stored across itself and another disk or not; and information concerning the data content of each disk. For example, FIG. 3 shows that a disk with a disk ID (0002) is mounted on the slot 2 of the optical disk mounting device 108, that the disk has been accessed ten times so far, and that the data content of the disk is document data. The slots provide positions where individual disks can be mounted in the optical disk mounting device 108. In addition, FIG. 3 also shows that a disk with a disk ID (0004) is mounted on the optical disk carrying device 107, the disk has been accessed twenty times so far, and that the data content of the disk is image data. In addition, the column "disk-crossing information" of the disk with the disk ID (0004) reads "0001". This means that the disk with the disk ID (0004) includes data stored across itself and a disk with a disk ID (0001). Therefore, if a user accesses the disk with the disk ID (0004), it becomes possible to reduce the time necessary for disk access in the data library apparatus by preparing in advance the disk with the disk ID (0001). Here, the data content of the disk with the disk ID (0004) is image data. In general, if a user accesses image data, it is predicted for the user to successively access other image data. Therefore, if the user accesses the disk with the disk ID (0004), it becomes possible to reduce the time necessary for disk access in the data library apparatus by preparing in advance a disk with a disk ID (0007) that stores image data.

Here, three examples will be cited as methods to prepare a disk that is expected to be accessed next.

A first method is a method in which disks expected to be accessed next are mounted on the recording/reproducing device 110, 111, 112, and/or 113 in advance. If there are data recording/reproducing devices that are not used, it is recommendable to mount the disks expected to be accessed next on the data recording/reproducing devices in advance, which makes it possible to reduce the time necessary for disk access. A second method is a method in which a disk expected to be accessed next is picked up in the optical disk carrying device 107 in advance. If all the data recording/reproducing devices 110, 111, 112, and 113 are used and no disk can be mounted on any of the data recording/reproducing devices 110, 111, 112, and 113, it is recommendable to pick up the disk expected to be accessed next in the optical disk carrying device 107 in advance. This makes it possible that, if any of the data recording/reproducing devices 110, 111, 112, and 113 becomes unused, the disk to be used next can be quickly mounted on the unused data recording/reproducing device. A third method is a method in which the disk expected to be used next is moved to be mounted on a slot that is nearer to the data recording/reproducing device 110, 111, 112, or 113 than the slot on which the disk is currently mounted in the optical disk mounting device 108. In the case where all the data recording/reproducing devices 110, 111, 112, and 114 are used, and the optical disk carrying device 107 is also used, the time necessary for disk access can be reduced by mounting the disk expected to be used next on the slot nearer to the data recording/reproducing devices 110, 111, 112, or 114. In the third method, however, it is necessary to use the optical disk carrying device 107 in order to move the disk expected to be used next to the new slot on which the disk is to be mounted. If the optical disk carrying device 107 is used for another piece of processing, it is necessary to perform the above-described third method in an interval during which the another piece of processing is suspended in order not to interfere with the another piece of processing.

Figure 4:
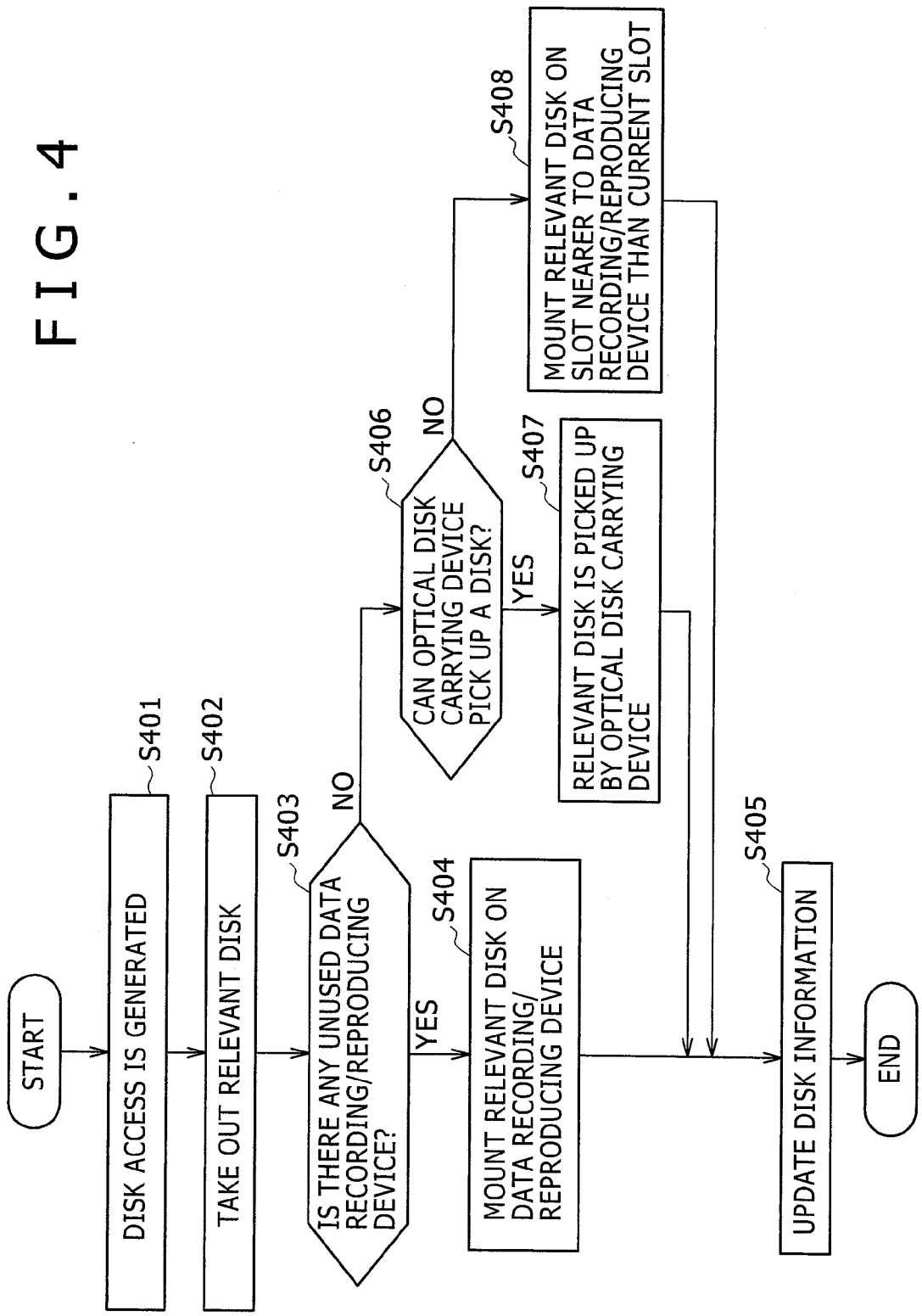
FIG. 4 is a flowchart showing processing for preparing a disk expected to be accessed next.

FIG. 4 is a flowchart showing processing for preparing a disk expected to be accessed next.

At step S401, a disk access is generated.

At step S402, a relevant disk expected to be accessed next is brought out on the basis of disk-crossing information and data contents stored in the memory 106. The brought-out relative disk is arranged so that it can be quickly accessed in response to a user's request at the processes of step S403 and the subsequent steps.

First, it is checked whether there is any unused data recording/reproducing device or not at step S403. In the configuration of the data library apparatus shown in FIG. 1, for example, there are four data recording/reproducing devices 110, 111, 112, and 113. If there is at least one unused data recording/reproducing device among these data recording/reproducing devices, the flow proceeds to step S404. At step S404, the brought-out relevant disk is mounted on the unused data recording/reproducing device. At step S405, the disk information stored in the memory 106 is updated in accordance with the processes performed at steps S402 to S404, and the flow ends.

If it is confirmed that all the data recording/reproducing devices are used at step S403, it is checked whether the optical disk carrying device 107 can pick up a disk or not at step S406. If the optical disk carrying device 107 is not used for carrying another disk, the optical disk carrying device 107 can pick up a disk, and thereby the flow proceeds to step S407. At step S407, the brought-out relevant disk is picked up by the optical disk carrying device 107. Subsequently, at step S405, the disk information stored in the memory 106 is updated in accordance with the processes performed at steps S402 and S407, and the flow ends.

At step S406, in the case where the optical disk carrying device 107 cannot pick up the brought-up disk for the reason that the optical disk carrying device 107 is carrying another disk or other reasons, it is necessary for the process at step S408 to be performed in an interval between the carrying processes. The interval is a spare time period where there is no need for the optical disk carrying device 107 to carry a disk between the optical disk mounting device 108 and the data recording/reproducing device 110, 111, 112, or 113. Because the disk carrying process is performed in response to a disk access request, the disk carrying process is not performed when there is no disk access request. The process at step S408 is performed in this spare time period. At step S408, the relevant disk brought out at step S402 is mounted on a slot that is nearer to the data recording/reproducing device 110, 111, 112, or 113 than the slot on which the relevant disk is currently mounted. At step S405, the disk information stored in the memory 106 is updated in accordance with the processes performed at steps S402 to S408, and the flow ends. In the process of mounting the relevant disk at step S408, there is a case where a destination slot on which the relevant disk is to be mounted has already been occupied by another disk. In general, because disks with high access frequencies are often mounted on slots nearer to the data recording/reproducing device 110, 111, 112, or 113 in order to make the disks easily accessible, there is a high possibility that such a case as above occurs. In such a case as above, a slot on which the relevant disk is mounted can be determined by taking the number of accesses into consideration with reference to the disk information stored in the memory 106. This method will be described hereinafter.

Figure 5:
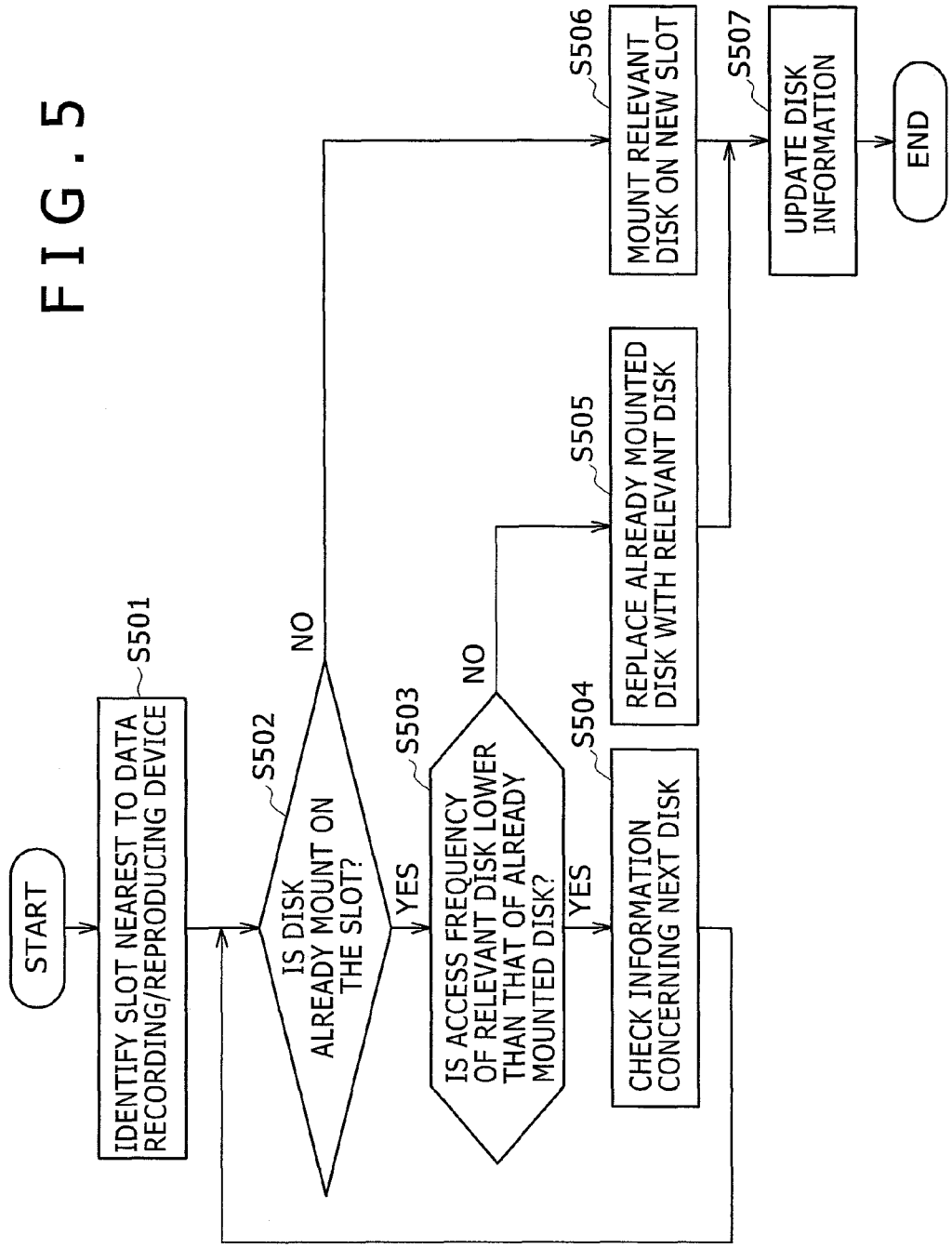
FIG. 5 is a flowchart showing processing for determining a slot on which the disk expected to be used next is mounted.

FIG. 5 is a flowchart showing processing for determining a slot on which the relevant disk is mounted.

At step S501, a slot nearest to the data recording/reproducing device 110, 111, 112, or 113 is identified on the basis of the disk information stored in the memory 106. Here, it will be assumed that the slot 1, slot 2, slot 3, etc. are slots that are nearer to the data recording/reproducing device 110, 111, 112, or 113 in this order. In other words, the slot 1 is the slot nearest to the data recording/reproducing device 110, 111, 112, or 113. At step S501, information concerning the slot 1 is checked, and if a disk is already mounted on the slot 1, the flow proceeds to step S503 to compare the access frequency of the relevant disk with that of the disk already mounted on the slot 1. If the access frequency of the disk already mounted is higher, the flow proceeds to step 504 and information concerning the next-nearest slot is checked. The processes at steps S502 to S504 are repeated, and if a slot on which a disk is not mounted is found, the flow proceeds to step S506, and the relevant disk is mounted on the slot. At the last step S507, the disk information stored in the memory 106 is updated in accordance with the processes performed at above steps, and the flow ends. On the other hand, while repeating steps 502 to 504, if the access frequency of a disk that is mounted is lower than that of the relevant disk at step S503, the flow proceeds to step S505, and the disk already mounted is replaced by the relevant disk. At step S507, the disk information stored in the memory 106 is updated in accordance with the processes performed at above steps, and the flow ends.

This embodiment has described two methods based on disk-crossing information and other relevant data as methods for predicting a disk expected to be accessed next. However, other methods for predicting a disk expected to be accessed next on the basis of other information can also be adopted. In addition, as methods to prepare a disk expected to be accessed next, this embodiment has described three methods—the first is the method in which a disk expected to be accessed next is mounted on the recording/reproducing device 110, 111, 112, or 113 in advance; the second is the method in which the disk expected to be accessed next is picked up in the optical disk carrying device 107 in advance; and the third is the method in which the disk expected to be used next is mounted on a slot that is nearer to the data recording/reproducing device 110, 111, 112, or 113 than the slot on which the disk is currently mounted. These three methods can respectively be given arbitrary priorities, and the method to prepare the disk expected to be accessed next shown in FIG. 4 is only an example. In addition, in the case of the method in which a disk expected to be accessed next is picked up in the optical disk carrying device 107 in advance, it is conceivable that the optical disk carrying device 107 is moved to the position of the data recording/reproducing device 110, 111, 112, or 113. As a result, if any of the data recording/reproducing devices 110, 111, 112, and 113 becomes available, the disk expected to be accessed next can be quickly mounted, and thereby it becomes possible to reduce the time necessary for disk access to a larger extent. In addition, in this embodiment, although the position of the optical disk carrying device 107 that is not operating has not been described, it is recommendable that the optical disk carrying device 107 is disposed at the position of the data recording/reproducing device 110, 111, 112, or 113. This is because a disk can be quickly loaded into or brought out from the data recording/reproducing device 110, 111, 112, or 113. Alternatively, it is also effective to mount a disk expected to be accessed next on a slot near to the data recording/reproducing device 110, 111, 112, or 113. This is because, in general, the disk expected to be accessed next is a disk with a high access frequency, and if the disk expected to be accessed next is mounted on a slot near to the data recording/reproducing device 110, 111, 112, or 113, it can be quickly mounted on the data recording/reproducing device 110, 111, 112, or 113. In addition, although this embodiment has described the method in which disks expected to be accessed next are mounted on the data recording/reproducing device 110, 111, 112, and/or 113, it is not always needed to mount the disks expected to be accessed next on all the data recording/reproducing devices 110, 111, 112, and 113. For example, the disks expected to be accessed next are mounted on the data recording/reproducing device 110, 111, and 112, while the data recording/reproducing device 113 is kept unused. With such an arrangement of the data recording/reproducing device 110, 111, 112, and 113, even if there is a reproducing request for a disk different from one expected to be accessed next, the unused data recording/reproducing device 113 can be used for the reproducing request, which can provide a flexible configuration of the data library apparatus 101. In addition, this embodiment has described some methods to prepare a disk that is expected to be accessed next, that is, the methods to prepare a disk on which data has already been recorded and read access will be performed. As described above, the disks with a high read access frequency are mounted on the slots near to the data recording/reproducing device 110, 111, 112, and 113 in the optical disk mounting device 108. On the other hand, this embodiment has not described the arrangement of unused disks that are targets of write access. In a data library apparatus, write access requests are usually made at night and so on when many read access requests are not generated. This leads to the reduction of severe loads on the data library apparatus. In this manner, generally speaking, the execution of data write requests does not need to be made as speedily as that of data read requests. Therefore, even if the unused disks are mounted on slots far from the data recording/reproducing devices 110, 111, 112, or 113, it does not bring about any trouble. In the case where this embodiment is applied to the data library apparatus, because disks expected to be targets of read access requests are mounted on slots near to the data recording/reproducing devices 110, 111, 112, or 113, disks that are targets of write access requests are inevitably mounted on slots far from the data recording/reproducing devices 110, 111, 112, or 113.

As described above, in the data library apparatus according to this embodiment of the present invention, it becomes possible that disks expected to be accessed next are prepared in advance, and these disks can be quickly accessed in response to a user's request. As a result, because the time needed by the optical disk carrying device that carries disks expected to be accessed next between the optical disk mounting device and the data recording/reproducing devices can be reduced, the time necessary for disk access in the data library apparatus can be reduced.

Second Embodiment

This embodiment will discloses a method in which a group of relevant disks are mounted on an optical disk mounting device as a whole, and the group of relevant disks can be brought out effectively. A group of relevant disks means a group of disks across which data is recorded or on which data having the relevant data contents are recorded. Here, the configuration of a data library apparatus used by this embodiment is the same as the configuration shown in FIG. 1. In addition, an optical disk carrying device 107 becomes powerful if it can take in plural disks from an optical disk mounting device 108 at a time.

Here, it will be assumed that the optical disk carrying device 107 has plural openings for loading or bringing out disks, and thereby can brings out plural disks from plural slots of the optical disk mounting device 108 at a time. In order to enable the optical disk carrying device 107 to bring out a group of relevant disks at a time without being moved, it is necessary that the relevant disks be mounted on neighboring slots or on nearby slots. As a result, because the group of relevant disks can be carried at a time, the time necessary to carry the group of relevant disks can be reduced, and thereby the time necessary for disk access in the data library apparatus can be reduced.

Figure 6:
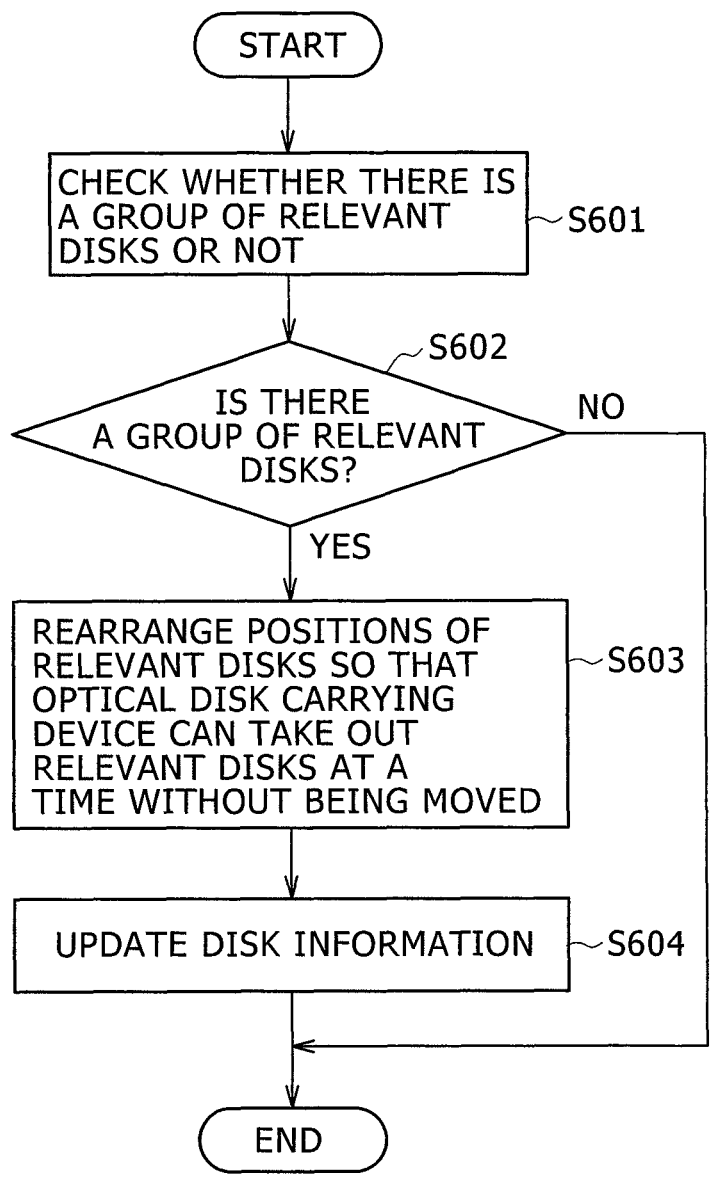
FIG. 6 is a flowchart showing an example of processing for mounting a group of relevant disks.

FIG. 6 is a flowchart showing an example of processing of mounting a group of relevant disks on the optical disk mounting device 108.

At step S601, it is checked whether there is a group of relevant disks or not on the basis of disk-crossing information and data contents stored in a memory 106. At step S602, if there is no group of relevant disks, the flow ends. If there is a group of relevant disks, the positions of the relevant disks in the optical disk mounting device 108 are rearranged so that the optical disk carrying device 107 can bring out the relevant disks at a time without being moved. Subsequently, at step S604, the disk information stored in the memory 106 is updated in accordance with the processes performed at steps S603, and the flow ends.

Figure 7:
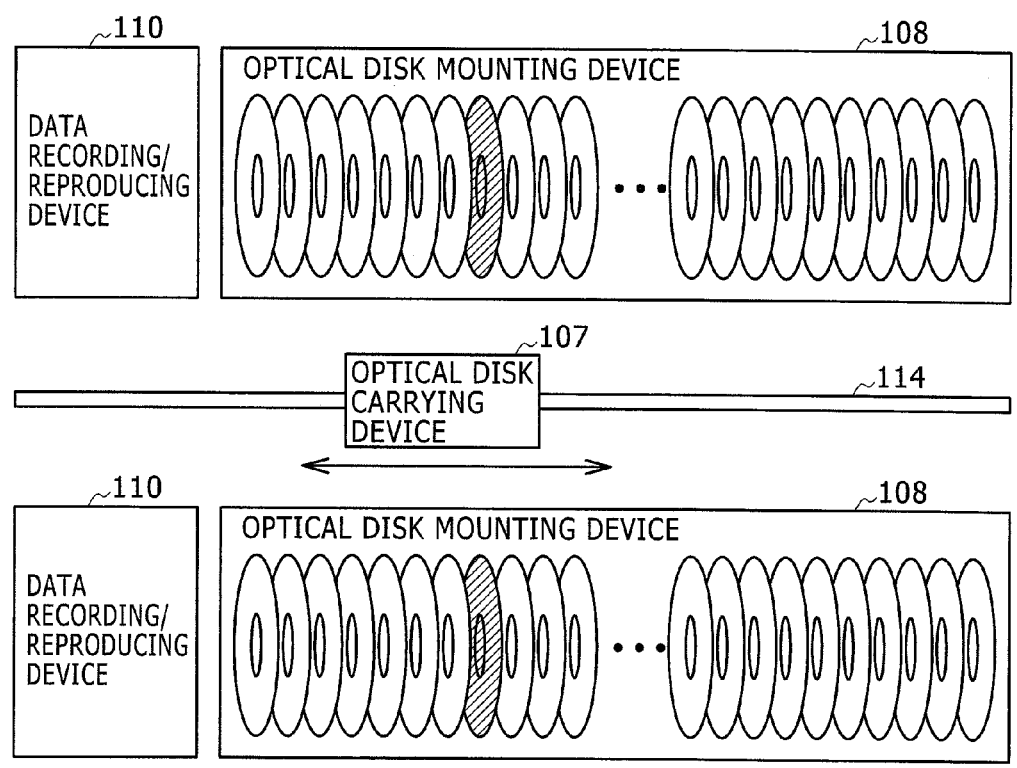
FIG. 7 is a diagram showing an example of a data library apparatus on which plural optical disk mounting devices are mounted.

FIG. 7 is a diagram showing an example of a data library apparatus on which plural optical disk mounting devices are mounted.

Different from the data library shown in FIG. 2, this data library apparatus is equipped with another optical disk mounting device 108 along a rail 114. In this configuration, the members of a group of relevant disks are divided into two subgroups and two subgroups are respectively mounted on two optical disk mounting devices on a one subgroup-by-one optical disk mounting device basis, and the above-described technique can be applied to such an arrangement of the group of the relevant disks. For example, it will be assumed that one of a pair of relevant disks is mounted on one optical disk mounting device and the other is mounted on the other optical disk mounting device symmetrically about the rail 114. In FIG. 7, it will be assumed that two shaded disks form a pair of relevant disks. If the optical disk carrying device 107 is equipped with plural openings, and is capable of bringing out disks from the plural optical disk mounting devices and taking in the disks through the plural openings, it becomes possible for the optical disk carrying device 107 to take in the pair of relevant disks at a time.

In FIG. 7 of this embodiment, although the data library apparatus equipped with two optical disk mounting devices 108 from which a group of relevant disks are brought out at a time has been described so far, the number of the optical disk mounting devices 108 can be arbitrary other than two. It is conceivable that the optical disk carrying device 107 brings out disks from more than two optical disk mounting devices 108 in accordance with the number and position of openings of the optical disk carrying device 107.

As described above, according to this embodiment, the data library apparatus in which the optical disk carrying device 107 can bring out a group of relevant disks without being moved can be provided. This makes it possible that the distance the optical disk carrying device has to move in order to take out disks becomes short, which can reduce the time necessary for disk access in the data library apparatus.

Here, the above-described embodiments can be redescribed as follows. The data library apparatus according to the above-described embodiments is a data library apparatus that manages plural optical disks and reproduces data. In addition, the data library apparatus includes plural optical disk drives that reproduce the optical disks; an optical disk carrying device that carries these optical disks to the plural optical disk drives; and a controller that controls this optical disk carrying device. When there is a predetermined data request from a host, the controller controls the optical disk carrying device so that the optical disk carrying device carries a certain optical disk among the plural optical disks to one of the optical disk drives and after the certain optical disk is carried to the one of optical disk drives, the controller controls the optical disk carrying device so that the optical disk carrying device prepares an optical disk that is relevant to the certain disk carried to the one of the optical drives.

Here, the present invention is not limited to the above-described embodiments, and it is obvious that various modifications of the present invention may be made. For example, each of the above embodiments has been described in detail in order to make the present invention easily understood, and therefore the entirety of the configuration of each above-described embodiment is not always indispensable for the present invention. In addition, a part of the configuration of one embodiment can be replaced with a part of configuration of another embodiment, or a new embodiment of the present invention may be made by adding a part of the configuration of one embodiment to the configuration of another embodiment. In addition, a new embodiment of the present invention may be made by adding a different configuration to a part of the configuration of each embodiment, deleting a part of configuration from each embodiment, or replacing a part of configuration of each embodiment with a different configuration.

In addition, the above-described configurations, functions, processing units, processing means, etc. can be realized in their part or in their entirety by hardware such as integrated circuits. Alternatively, the above configurations, functions, etc. can be realized by software provided by programs that are interpreted and executed by a processor in order to realize the workings of the above configurations, functions, etc. The programs and information included by tables and files that realize the above-described functions can be recorded in recording devices such as a memory, a hard disk, and a solid state drive (SSD), or in recording media such as an IC card, an SD card, and a DVD.

In addition, in the above-described embodiments, the minimum necessary numbers of control lines and information lines have been shown in the accompanying drawings, and not all the control lines and information lines necessary for the data library apparatus to work as a product are shown. In reality, it can be said that all the components of the data library apparatus according to the present invention are connected with each other.

What is claimed is:

1. A data library apparatus managing a plurality of recording media and recording or reproducing data in or from the plurality of recording media, comprising:
   a control device for controlling pieces of processing performed by devices;
   one or more data recording/reproducing devices for recording or reproducing data in or from the plurality of recording media;
   a recording medium carrying device for carrying the recording media to a recording media mounting area and the data recording/reproducing devices and bringing out or loading the recording media from or into the recording medium mounting area and the data recording/reproducing devices; and
   a memory unit for storing information concerning the recording medium, wherein the control device selects, with reference to information stored in the memory unit, a second recording medium expected to be accessed next on the basis of information concerning a first recording medium that is now accessed.

2. The data library apparatus according to claim 1, wherein the control device refers to information whether data recorded in the first recording medium is recorded in the second recording medium in recording medium-crossing fashion as referential information for bringing out the second recording medium.

3. The data library apparatus according to claim 1, wherein the control device refers to information whether data recorded in the first recording medium is relevant to data recorded in the second recording medium as referential information for bringing out the second recording medium.

4. The data library apparatus according to claim 1, wherein the control device mounts the second recording medium on the data recording/reproducing device.

5. The data library apparatus according to claim 1, wherein the control device mounts the second recording medium on the recording medium carrying device.

6. The data library apparatus according to claim 1, wherein the control device changes the current mounting position of the second recording medium in the recording medium mounting area to a mounting position nearer to the data recording/reproducing devices than the current mounting position.

7. The data library apparatus according to claim 6, wherein, if there is a third recording medium on the destination mounting position (the mounting position nearer to the data recording/reproducing devices than the current mounting position of the second recording medium), the control device compares the access frequency of the second recording medium with the access frequency of the third recording medium with reference to the information stored in the memory unit, and judges whether to replace the third recording medium with the second recording medium or not on the basis of the comparison result.

8. The data library apparatus according to claim 1, wherein the recording medium carrying device is capable of taking in a plurality of the recording media from the recording medium mounting area.

9. The data library apparatus according to claim 8, wherein the control device mounts, with reference to the information stored in the memory unit, a plurality of the recording media including relevant data on positions that enable the recording medium carrying device to bring out the plurality of the recording media without being moved.

* * * * *